US005561755A

United States Patent [19]

Bradley

[11] Patent Number: 5,561,755

[45] Date of Patent: Oct. 1, 1996

[54] METHOD FOR MULTIPLEXING VIDEO INFORMATION

[75] Inventor: Eric K. Bradley, Columbus, Ind.

[73] Assignee: Ingersoll-Rand Company, Woodcliff Lake, N.J.

[21] Appl. No.: 280,697

[22] Filed: Jul. 26, 1994

[51] Int. Cl.[6] .............................................. G06F 3/14

[52] U.S. Cl. .................................. 395/157; 395/158

[58] Field of Search ............................ 395/157, 158; 345/119, 120

[56] References Cited

U.S. PATENT DOCUMENTS

| | | | |
|---|---|---|---|
| 4,710,767 | 12/1987 | Sciacero et al. | 345/119 X |
| 4,769,762 | 9/1988 | Tsujido | 395/157 |
| 4,780,709 | 10/1988 | Randall | 345/120 X |
| 4,823,108 | 4/1989 | Pope | 345/120 |
| 4,890,257 | 12/1989 | Anthias et al. | 395/157 |
| 4,951,229 | 8/1990 | Dinicola et al. | 395/152 |
| 4,954,819 | 9/1990 | Watkins | 345/119 |
| 4,961,071 | 10/1990 | Krooss | 345/119 |
| 5,001,469 | 3/1991 | Pappas et al. | 345/120 |
| 5,061,919 | 10/1991 | Watkins | 345/115 |
| 5,128,658 | 7/1992 | Pappas et al. | 345/119 X |
| 5,216,413 | 6/1993 | Seiler et al. | 345/120 |
| 5,241,656 | 8/1993 | Loucks et al. | 395/158 |
| 5,276,437 | 1/1994 | Horvath et al. | 345/119 |
| 5,475,812 | 12/1995 | Corona et al. | 395/158 |
| 5,485,562 | 1/1996 | Narayanaswami | 395/157 X |
| 5,515,494 | 5/1996 | Lentz | 395/157 |

*Primary Examiner*—Raymond J. Bayerl
*Assistant Examiner*—Crescelle N. dela Torre
*Attorney, Agent, or Firm*—Michael M. Gnibus

[57] ABSTRACT

A method for visually multiplexing video information presentation system permits obscured windows to be continuously updated, which, when revealed, will present the new contents within the window without requiring a host system to redraw all obscured window areas. The system operates by holding the contents of each windows pixels in separate areas of memory. The displayed screen is a mosaic of pixels chosen based on a pixel position ownership table that is maintained by the system as screen commands are sent by the host.

7 Claims, 8 Drawing Sheets

| PIXEL MEMORY ID: 0 | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 1 | 1 | 1 | 1 | 0 | 0 | 0 |
| 1 | 1 | 1 | 1 | 1 | 1 | 1 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 1 | 1 | 1 | 1 | 1 | 1 | 1 |
| 1 | 1 | 1 | 1 | 1 | 1 | 1 | 1 | 1 | 1 |

| OBSCURING: ID 0 | | | | | | | | | |
|---|---|---|---|---|---|---|---|---|---|
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |

| OBSCURED BY: ID0 | | | | | | | | | |
|---|---|---|---|---|---|---|---|---|---|
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |
| – | – | – | – | – | – | – | – | – | – |

| VIDEO DISPLAY | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 1 | 1 | 1 | 1 | 0 | 0 | 0 |
| 1 | 1 | 1 | 1 | 1 | 1 | 1 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 1 | 1 | 1 | 1 | 1 | 1 | 1 |
| 1 | 1 | 1 | 1 | 1 | 1 | 1 | 1 | 1 | 1 |

| PIXEL MEMORY ID: 1 | | | | | |
|---|---|---|---|---|---|
| 0 | 0 | 0 | 0 | 0 | 0 |
| 0 | 1 | 1 | 1 | 1 | 0 |
| 0 | 1 | 0 | 0 | 0 | 1 |
| 0 | 1 | 0 | 0 | 0 | 1 |
| 0 | 1 | 1 | 1 | 1 | 0 |
| 0 | 1 | 0 | 0 | 0 | 1 |
| 0 | 1 | 0 | 0 | 0 | 1 |
| 0 | 1 | 1 | 1 | 1 | 0 |

| OBSCURING: ID 1 | | | | | |
|---|---|---|---|---|---|
| – | – | – | – | – | – |
| – | – | – | – | – | – |
| – | – | – | – | – | – |
| – | – | – | – | – | – |
| – | – | – | – | – | – |
| – | – | – | – | – | – |
| – | – | – | – | – | – |
| – | – | – | – | – | – |

| OBSCURED BY: ID1 | | | | | |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

| VIDEO DISPLAY | | | | | | | | | |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 1 | 1 | 1 | 1 | 0 | 0 | 0 |
| 1 | 1 | 1 | 1 | 1 | 1 | 1 | 0 | 0 | 0 |
| 1 | 1 | 1 | 0 | 0 | 0 | 0 | 0 | 0 | 0 |
| 1 | 1 | 1 | 0 | 0 | 0 | 0 | 0 | 0 | 0 |
| 1 | 1 | 1 | 1 | 1 | 1 | 1 | 1 | 1 | 1 |
| 1 | 1 | 1 | 1 | 1 | 1 | 1 | 1 | 1 | 1 |

METHOD FOR MULTIPLEXING VIDEO INFORMATION

BACKGROUND OF THE INVENTION

This invention generally relates to computer screen displays, and more particularly to a method for effectuating the presentation of multiple overlapping images on displays commonly used in computer systems, data processing systems and electronically controlled machines, such as compressors, for example.

Modern graphics processors are capable of simultaneously executing, or essentially simultaneously executing, a plurality of separate graphics routines or programs, which may be dependent or independent. Typically, each of these graphics routines "assumes" that it may utilize an entire computer display area available to it, and outputs pixel data, i.e. image data, accordingly. Such techniques for simultaneously displaying a portion of each of the images produced by such separate graphics routines on a single screen are referred to as "windowing" techniques.

Windowing systems are a widely available and accepted means of presenting video information to a computer or equipment operator. Windowing permits the placement of multiple, overlapped pages on a single computer display or computer screen.

The human mind is capable of detecting the placement of a new page over currently displayed pages and directing its attention to the newly visible page. Proper placement of the page will keep important information in the field of view of the user for easy reference. Each page acts as an information grouping device which helps remind the user of importance and relationship of various bits of the data. This method of displaying multiple windows of information has a wide range of applications from customer information kiosks to operator interface panels on virtually any piece of complicated machinery.

Currently, systems capable of partially overlaying pages of information require significant and costly amounts of CPU power and memory storage to achieve acceptable performance. These systems also require high speed parallel datalink connections to the host processor. Attempts have been made by various display designers to migrate this functionality to low cost embedded microcontroller based electronics. When the speed and memory burdens are placed on these low cost microcontrollers, the visual update performance seen by the operator is often unacceptable. To increase the update speed, available systems place severe limitations on the placement of information. More specifically, text fonts are often limited in size and placement on the screen. Ultimately, this lowers the quality of the information presented and the delight of the user with the product.

Another severe limitation imposed by these low cost systems is that when a page is partially or fully overlaid upon page, the obscured page contents cannot be modified until the page is fully revealed. This places an undue restriction on the host processor when the processor updates information across all pages. The net result is that more cost and complexity are required of the host system to overcome this problem.

The foregoing illustrate limitations known to exist in present methods for visually multiplexing video information on a computer display, or windowing video information. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The present invention eliminates the restrictions imposed by the prior art by employing a novel memory storage system for video information. In one aspect of the present invention, this is accomplished by providing a method for multiplexing video information as a plurality of windows on a low cost display apparatus. The method of the present invention permits a low cost display apparatus to display multiple video information windows, to update such windows while hidden or partially obscured, and to display bitmaps and the like. The method of the present invention provides a means for permitting an underlying window to immediately display real time updated information upon the removal of an overlaid window which previously had been obscuring an underlying window.

The method of the present invention comprises the following steps:

- creating in a RAM memory, which communicates with the CPU, a plurality of tables for storing video pixel information and pixel ownership information for the window, and wherein the video pixel information is stored in a pixel content table and the pixel ownership information is stored in both an "obscuring" table and an "obscured by" table;
- storing an image in the pixel content table for display by the window;
- preparing a predetermined image to be displayed in the window by setting a predetermined pixel ownership value for each individual pixel in both the "obscuring" table and the "obscured by" table; and
- displaying the image of the window by copying the video pixel information from the pixel content table to a video memory of the display.

The foregoing and other aspects will become apparent from the following detailed description of the invention when considered in conjunction with the accompanying drawing figures.

BRIEF DESCRIPTION OF THE DRAWING FIGURES

FIGS. 6A–6F summarize the operation of multiplexing video information in accordance with the present invention.

DETAILED DESCRIPTION

Figure 1:
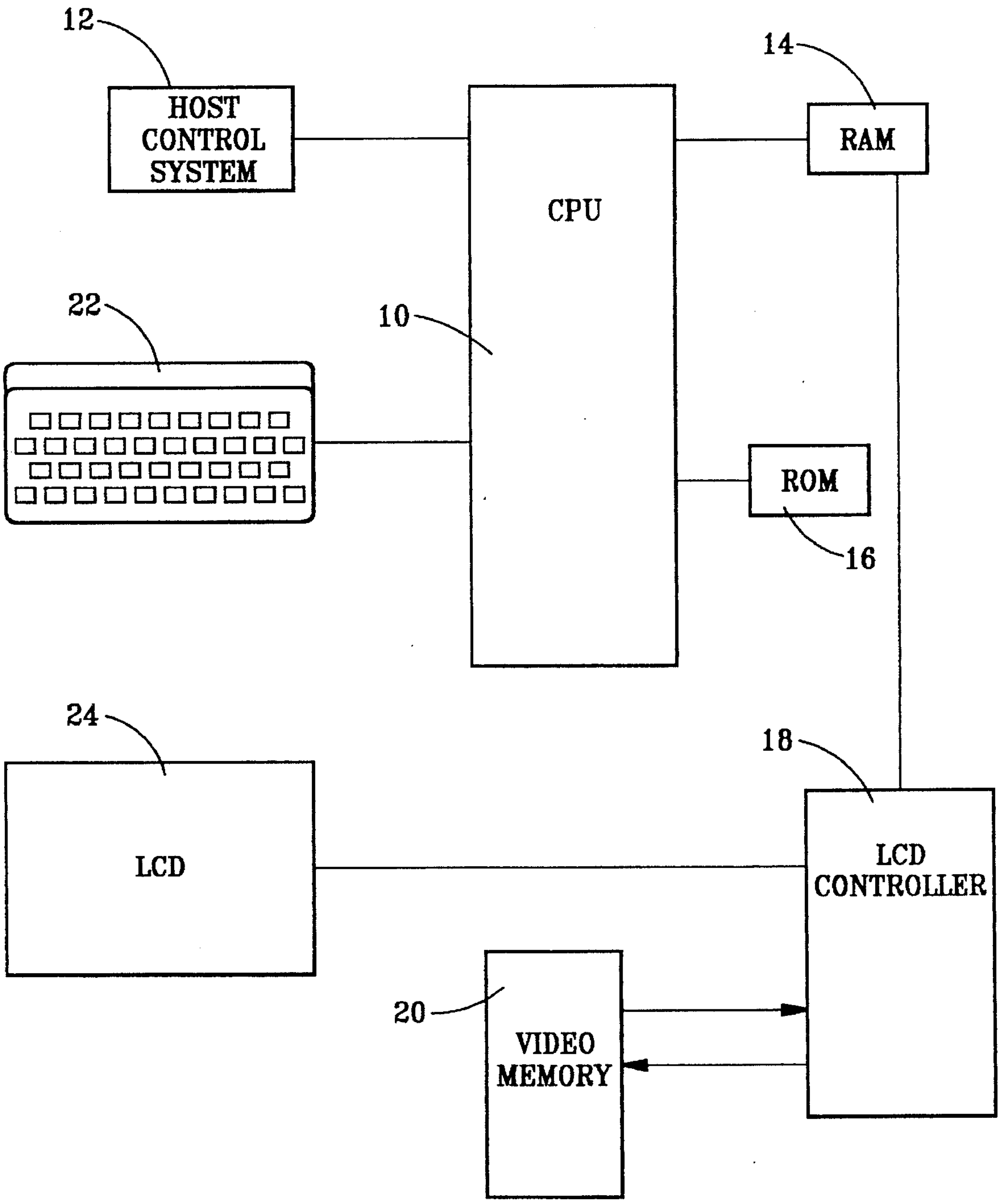
FIG. 1 is a functional block diagram of a system which employs a method for multiplexing video information as a plurality of windows on a display in accordance with the teachings of the present invention.

Referring now to the drawings, wherein similar reference characters designate corresponding parts throughout the several views, the system of FIG. 1 includes a central processing unit (CPU) 10; a host control system 12; a random access memory (RAM) 14; a read only memory (ROM) 16; a data input apparatus 22, such as a keyboard or keypad, for example; and an output display apparatus.

In the preferred embodiment, the CPU 10 is a type 68306 MOTOROLA® microprocessor. (MOTOROLA is a registered trademark of Motorola, Inc. of Schaumburg, Ill.) The CPU 10 communicates with the host control system 12 via a serial data link, such as an RS-232C serial data link, for example. More particularly, CPU 10 processes predetermined data, from the host control system 12, for display on the LCD 24. The host control system 12 may be a personal or portable computer (PC), or any other similar type electronic controller that is able to communicate via an RS-232C serial data link.

The CPU 10 communicates with the RAM 14 (32K×16) which is conventional in design. The RAM 14 dynamically allocates memory for a variety of system functions, such as for displaying windows on the LCD 24, and for employing associated fonts and bit maps and the like. The ROM 16 (32K×16) stores the computer software which implements the method of the present invention as described in further detail hereinafter.

The CPU 10 processes predetermined data, from the host control system 12, for display on an appropriate output display apparatus. As described herein, the output display apparatus includes an LCD controller 18, a video memory 20 and a liquid crystal display (LCD) 24. The LCD controller 18, the video memory 20 and the LCD 24 are conventional in design. Although an LCD type output display apparatus is described herein, it should be understood that any appropriate output display apparatus may be used. For example, other appropriate output display apparatuses may include a plasma display, a vacuum fluorescent display or a cathode ray tube (CRT) display.

The method of the present invention permits multiple pages of information to be stored in different locations in the RAM 14. The CPU 10 overlays different windows on the LCD 24 by creating a mosaic of pixels from the different pages. For example, a base page may occupy the entire display screen of the LCD 24. Each displayed pixel in the mosaic is "owned" by the base screen. A window to be overlaid upon the base window may occupy one fourth of the total space of the LCD. When this second overlaying window is commanded to be displayed at a predetermined location on the LCD screen, placement thereof is accomplished visually by changing the ownership of all the pixels at the predetermined location of the base page to the overlaying window. As the CPU 10 updates the LCD 24, it simply places the pixel from the owning page on the screen. This method has the appearance of overlaying pages on the LCD 24. Placing a window that may overlay both of the displayed windows is accomplished in the same manner. However, removal of a screen that both obscures and is obscured is not possible without additional ownership information storage as described in further detail hereinafter.

To fully describe the window ownership of each pixel, the stored window remembers for each pixel what page it is obscuring when it was displayed and which page obscured it after it was displayed. With this information available, removing a page from the screen is accomplished by setting the obscured page's pixel owner to the obscuring page's pixel. If the pixel is not obscured, meaning it is visible on the screen, the obscured page's pixel will immediately become visible upon removal of the overlaying page. This achieves two main goals. First, it easily allows the removal of a page inserted between two pages. Secondly, it decouples the pixel value from the value displayed on the screen so that changes become immediately visible upon the pixel being revealed.

Figure 5:
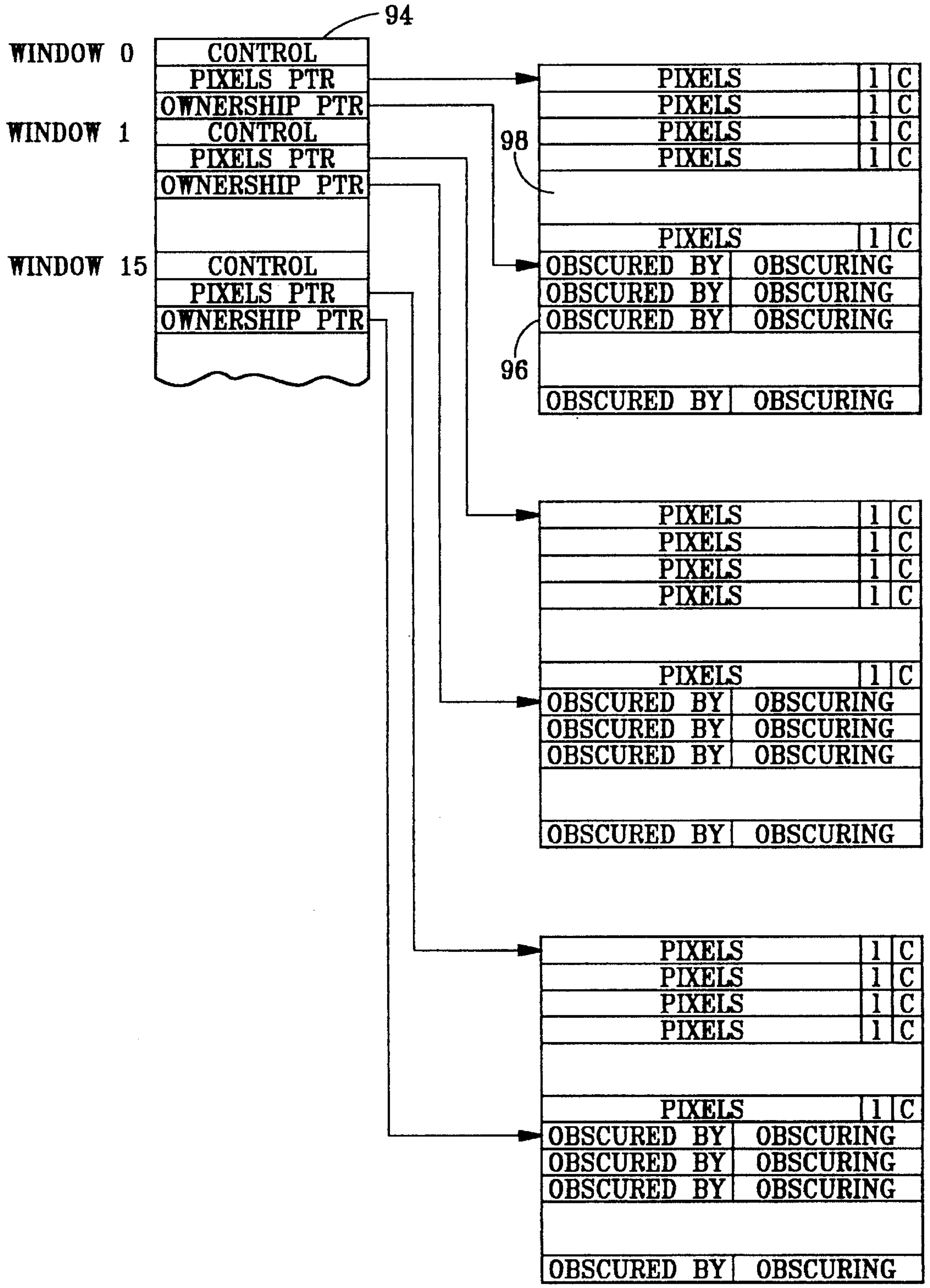
FIG. 5 is a diagram which illustrates how the contents of the windows are maintained during implementation of the method of the present invention.

As outlined in FIGS. 5 and 6A–F pixels are organized into groups of six. Additionally, pixel ownership is established for the pixels in two separate tables, i.e. an "Obscured By" table and an "Obscuring" table. The ownership data for the group of six pixels is provided for in the respective tables as a field for the six pixels rather than having a field for each individual pixel. The effect of this implementation is that the starting point for each displayed page can only be located at integer multiples of 6 pixels across the screen. In this implementation, the "Obscured By" field and the "Obscuring" field are allocated 4 bits each allowing a maximum of 16 different pages. As best seen by FIG. 5, two more bits are allocated as status bits for other features, such as for "Inversion Control" (I) or to indicate a "Change Status" (C). This particular implementation then requires 2 bytes of memory for every 6 pixels. However, as is well known in the art, tradeoffs in memory size and bit allocation can be made to increase the number of windows by limiting the position flexibility of the window. Also, increasing the available memory size allows the implementation to be extended to the disclosed concept in which each pixel has individual ownership fields.

Figure 2:
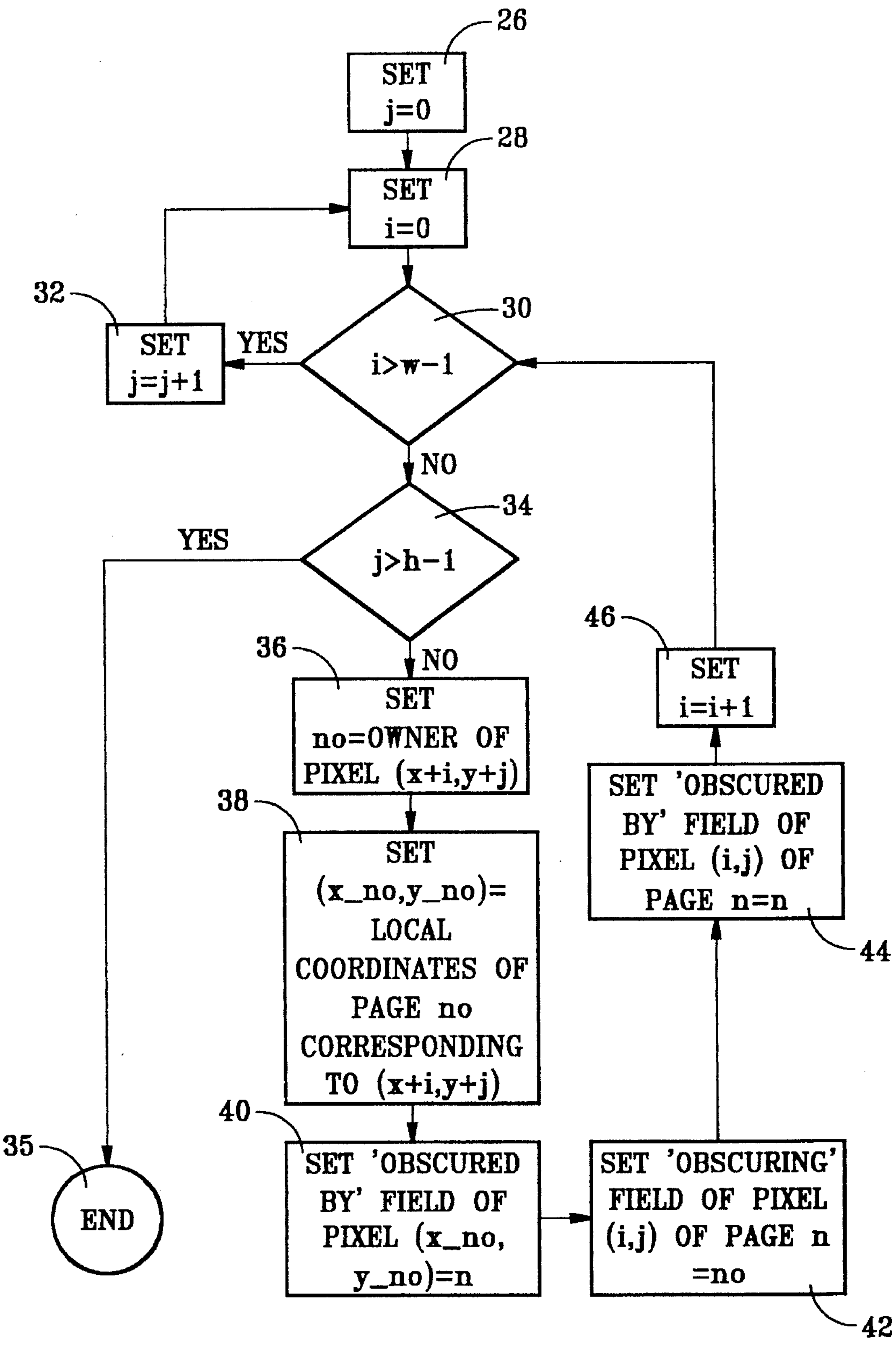
FIG. 2 is a flow diagram for a display window routine in accordance with the method of the present invention.

FIG. 2 is a flow diagram for a display window routine in accordance with the method of the present invention. Each individual window to be displayed is defined by a discrete window height <h> and window width <w>. Also, the individual window to be displayed includes a pixel reference location. For each window, the pixel reference location is provided at <i,j>, where i equals zero and j equals zero. Therefore, the pixel reference location for each window to be displayed is the upper left corner for that individual window. As the host control system 12 requests that an individual window be displayed, or as an end user initiates commands to display a predetermined window, the CPU 10 initiates the display window routine.

Briefly, the display window routine displays a predetermined window or page at a predetermined screen coordinate <x,y> of the LCD 24. The window or page to be displayed has an identification of <n>, a predetermined width <w> and a predetermined height <h>. In the described embodiment, n is an integer from 0 to 15. The window to be displayed is comprised of a field of pixels having individual predetermined pixel locations, within the field of pixels, of <i,j>.

To display a window <n> of width <w> and height <h> at screen coordinates <x,y>:

for j from 0 to (h–1) do; and for i from 0 to (w–1) do;
  set <no> to the owner of the screen pixel <x+i,y+j>,
  set <x_no,y_no> to the local coordinates corresponding to <x+i,y+j> of page <no>,
  set pixel <x_no,y_no> of page <no> "Obscured By" field to <n>,
  set pixel <i,j> of page <n> "Obscuring" field to <no>, and
  set pixel <i,j> of page <n> "Obscured By" field to <n>.

In FIG. 2, blocks 26 and 28 provide for an initialization so that the display window routine is able to individually scan individual pixels of the window, the individual pixels being located at a predetermined horizontal coordinate i and a vertical coordinate j. The procedure of scanning through the pixels of the window to be displayed occurs at steps 30, 32 and 34. As outlined in FIG. 2, the individual pixels of the window to be displayed are scanned horizontally from left to right. Upon completion of the horizontal scan at step 30, the horizontal row of pixels to be scanned is incremented at step 32. This scanning is continued throughout the entire height of the window as determined by steps 34 and 35.

Throughout the scanning of the individual pixels in steps 30, 32, 34 and 35, the actions of steps 36, 38, 40, 42, 44 and 46 manipulate various ownership fields for the individual pixels. At step 36, a variable <no> is set to equal the owner of pixel (x+i,y+j). Accordingly (x+i,y+j) represents the global location of the individual pixel being scanned. At this step the owner of the pixel is determined relative to the global space. Once the owner of the pixel is determined at step 36, the corresponding local coordinates of the individual pixel are determined at step 38. As should be understood, the local coordinates of the individual pixels are determined relative to the pixel reference location in the upper left portion of the window to be displayed.

At step 40, the "Obscured By" field for the individual scanned pixel is revised to correctly reflect by which page the present owner of pixel (x+i,y+j) is to be obscured. In the case of a display of a new overlaying page <n>, at step 40 the "Obscured By" field for the individual scanned pixel is set to <n>. Corresponding to step 40, at step 42 the "Obscuring" field for the pixel (i,j) of page <n> is set to <no>. This setting reflects the fact that the pixel (i,j) of page <n> is to obscure the previous owner of the pixel, i.e. page <no>. At step 44, the "Obscured By" field for pixel (i,j) of the local window to be displayed is set to the identification of the window to be display, i.e. <n>.

To delete a window having an identification of <n>, a width <w> and a height <h> at screen coordinates <x,y>:

for j from 0 to (h−1) do; for i from 0 to (w−1) do;
  set <no> to the "Obscuring" value of page <n> pixel <i,j>,
  set <nv> to the "Obscured By" value of page <n> pixel <i,j>,
  set <x_no,y_no> to the local coordinates corresponding to <x+i,y+j> of page <no>,
  set <x_nv,y_nv> to the local coordinates corresponding to <x+i,y+j> of page <nv>,
  set pixel <x_no,y_no> of page <no> "Obscured By" field to <nv>,
  set pixel <x_nv,y_nv> of page <nv> "Obscured By" field to <no>,
  set pixel <i,j> of page <n> "Obscured By" field to <0>,
  set pixel <i,j> of page <n> "Obscuring" field to <NULL>.

Figure 3:
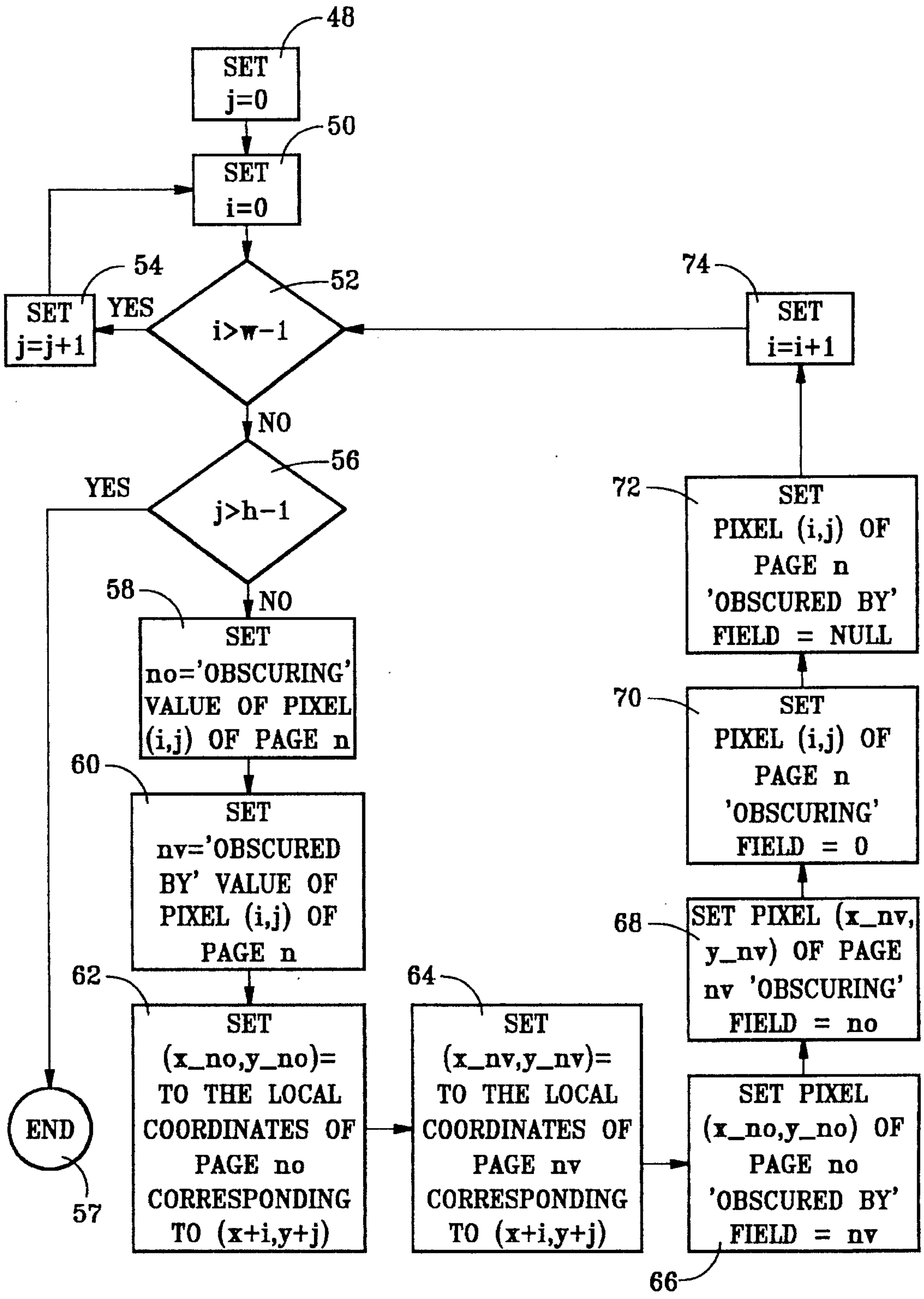
FIG. 3 is a flow diagram for a delete window routine in accordance with the method of the present invention.

In FIG. 3, blocks 48 and 50 provide for an initialization so that the delete window routine is able to scan individual pixels of the window, the individual pixels being located at a predetermined horizontal coordinate i and a vertical coordinate j. The procedure of scanning through the pixels of the window to be deleted occurs at steps 52, 54, 56. As outlined in FIG. 3, the individual pixels of the window to be displayed are scanned horizontally from left to right. Upon completion of the horizontal scan at step 52, the horizontal row of pixels to be scanned is incremented at step 54. This scanning is continued throughout the entire height of the window to be deleted, as determined by steps 56 and 57.

Briefly, in a most simple delete window scenario, two windows are displayed on the LCD 24. A base window is partially obscured by an overlaying window. In this delete window scenario, the top overlaying window is deleted by simply reversing the logic routines of FIG. 2 which were employed to display the overlaying window in the first instance. Therefore, the overlaying window is deleted by simply setting the "Obscured By" field of the base window to a value equal to the identification of the base window. This has the effect of deleting the overlaying window. However, a more complex delete window scenario arises when a window to be deleted is positioned between a bottom base window and a top overlaying window. The subroutine for this delete window scenario is diagrammed in FIG. 3.

Throughout the scanning of the individual pixels in steps 52, 54, 56, an 57, the actions of steps 58, 60, 62, 64, 66, 68, 70, and 72 manipulate various ownership fields for the individual pixels to delete a window <n> which is positioned between a bottom base window <no> and a top overlaying window <nv>.

At step 58 <no> is set to equal the "Obscuring" value of pixel (i,j) of window <n>. Additionally, <nv> is set to equal the "Obscured By" value of pixel (i,j) of page <n>. At step 62 the local coordinates of window <no> are determined relative to the global space. Likewise, at step 64 the local coordinates of window <nv> are determined relative to the global space. At step 66, the "Obscured By" field for pixel (x_no,y_no) of window <no> is set to equal <nv>. At step 68, the "Obscuring" field for pixel (x_nv,y_nv) of window <nv> is set to equal <no>. Therefore, at this time window <no> is obscured by window <nv>, which has the effect of deleting window <n>. To ensure that window <n> is completely deleted from display, steps 70 and 72 are performed. At step 70, the "Obscuring" field for pixel (i,j) of page <n> is set to a value equal to zero. At step 72, the "Obscured By" field for pixel (i,j) of page <n> is set to a NULL value, which means that the pixel is obscured by all windows.

Figure 4:
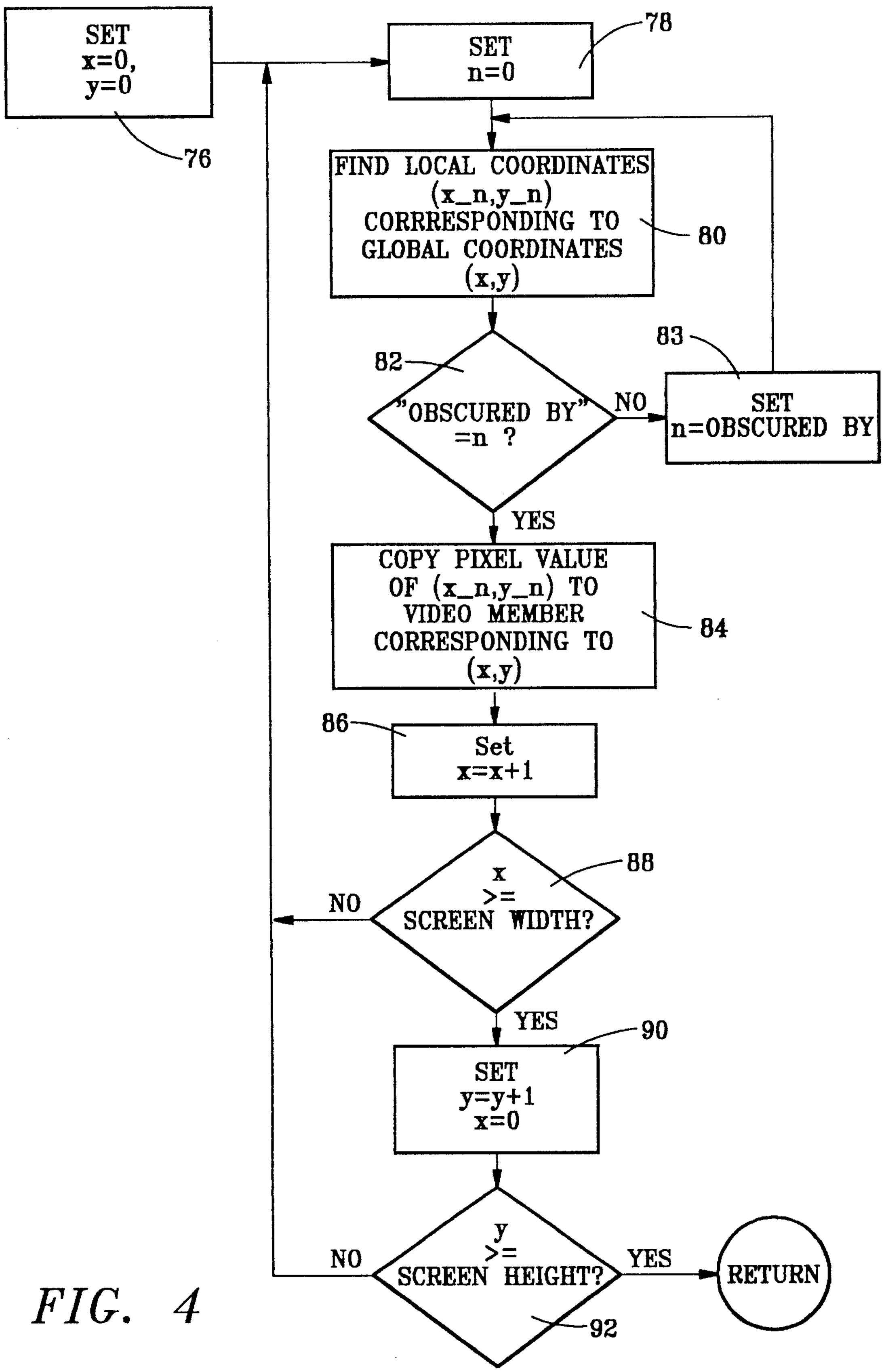
FIG. 4 is a flow diagram for an update display routine in accordance with the present invention.

FIG. 4 illustrates a flow diagram for a display update routine for updating the video memory 20 which, therefore, updates the actual contents of the display apparatus, such as the LCD 24. At steps 76 and 78 an initialization is performed. The host control system 12 may initiate the display update routine, also, a timer may initiate the display update routine. The display update routine provides an update scan starting from Window 0. The update scan is horizontal from the upper left corner of the display, left to right, across the LCD 24. At step 80, the local coordinates of the individual scanned pixel (x_n,y_n) are determined relative to the global coordinates (x,y). At step 82, the ownership of the individual scanned pixel is determined by querying whether the "Obscured By" field equals <n>. If the "Obscured By" field equals <n> at block 82, the pixel value of (x_n,y_n) is copied to the video memory 20 corresponding to (x,y). Steps 86, 88, 90 and 92 continue the scan of the individual pixels for the entire space of the display.

FIG. 5 is a memory storage scheme which illustrates how the contents of the windows are maintained during implementation of the method of the present invention. A master table is illustrated at 94, which contains references for each of the windows, i.e. Window 0 through Window 15. The control information may include window height, width, location and additional control information. The master table contains control information, a pixel pointer and an ownership pointer for each window. Also, each window includes an ownership table 96, and pixel information 98.

FIGS. 6A–6F summarize the operation for multiplexing video information in accordance with the present invention. FIGS. 6A–F each provide pixel memory information, pixel ownership information in the form of "Obscuring" and "Obscured By" tables, video display information and a depiction of the video display on a display apparatus, such as the LCD 24.

Figure 6A:

FIG. 6A depicts a base window having an identification value of 0. The pixel memory has stored therein a letter "E" in the form of "1" s and "0" s. Conventionally, a "1"

represents a dark square and a "0" represents a light square. The ownership table for Window 0, i.e. the "Obscuring" table and the "Obscured By", indicate a default ownership condition. Accordingly, the video display simply depicts a copy of the pixel memory, which is displayed as an "E" on the display apparatus.

Figure 6B:

FIG. 6B depicts the defining of a window having an identification value of 1, although Window 1 is not displayed in FIG. 6B. The pixel memory for Window 1 has stored therein a "B". The "Obscuring" table for Window 1 indicates that Window 1 is obscuring no other window, i.e. Window 1 has not been displayed. The "Obscured By" table for Window 1 is set to 0 meaning that Window 0 obscures Window 1 at this time. Because Window 1 has not yet been displayed, and because Window 0 is obscuring Window 1, the video display of the information remains unchanged, i.e. an "E" is displayed on the LCD 24.

Figure 6C:
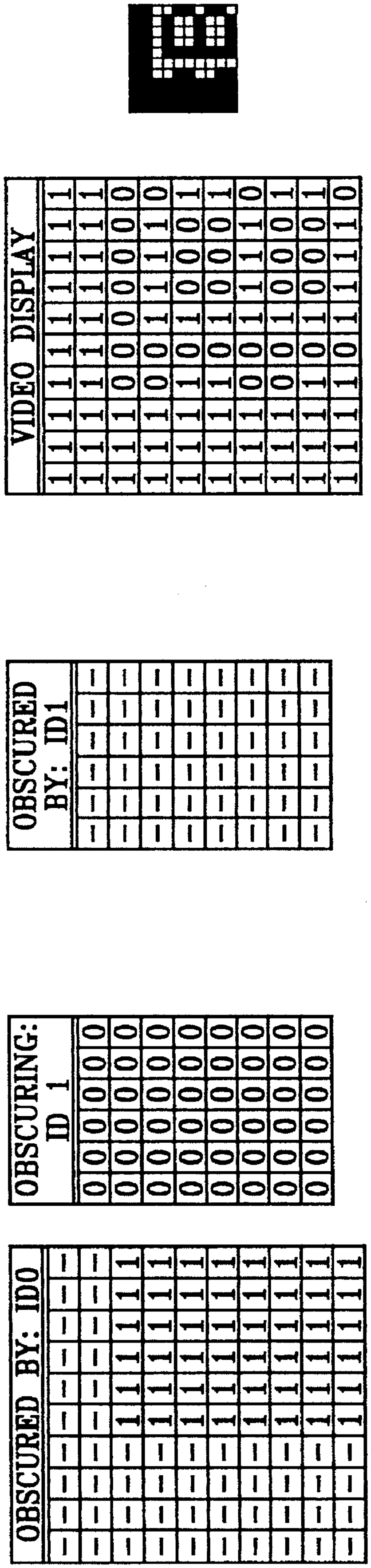

FIG. 6C depicts the product of the display window routine. As illustrated in FIG. 6C, the "Obscured By" table for Window 0 has been revised to indicate that at a predetermined location on Window 0, Window 1 is to be overlaid to display the contents of the pixel memory for Window 1. The "Obscuring" table for Window 1 has been revised to indicate that Window 1 will obscure Window 0. Also, the "Obscured By" table for Window 1 indicates that Window 1 is obscured by no other window. Accordingly, the video display depicts a "B" which has been overlaid upon the "E" of the base Window 0. This is then displayed on the LCD 24.

Figure 6D:
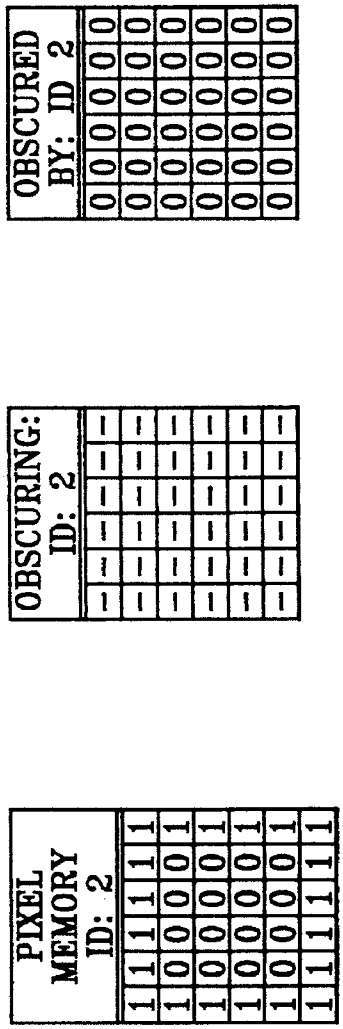

FIG. 6D depicts the defining of a window having an identification value of 2, although Window 2 is not displayed in FIG. 6D. The pixel memory for Window 2 has stored therein a "square". The "Obscuring" table for Window 2 indicates that Window 2 is obscuring no other window, i.e. Window 2 has not been displayed. The "Obscured By" table for Window 2 is set to 0 meaning that Window 0 obscures Window 2 at this time. Because Window 2 has not yet been displayed, and because Window 0 is obscuring Window 2, the video display of the information remains unchanged from that displayed in FIG. 6C.

Figure 6E:
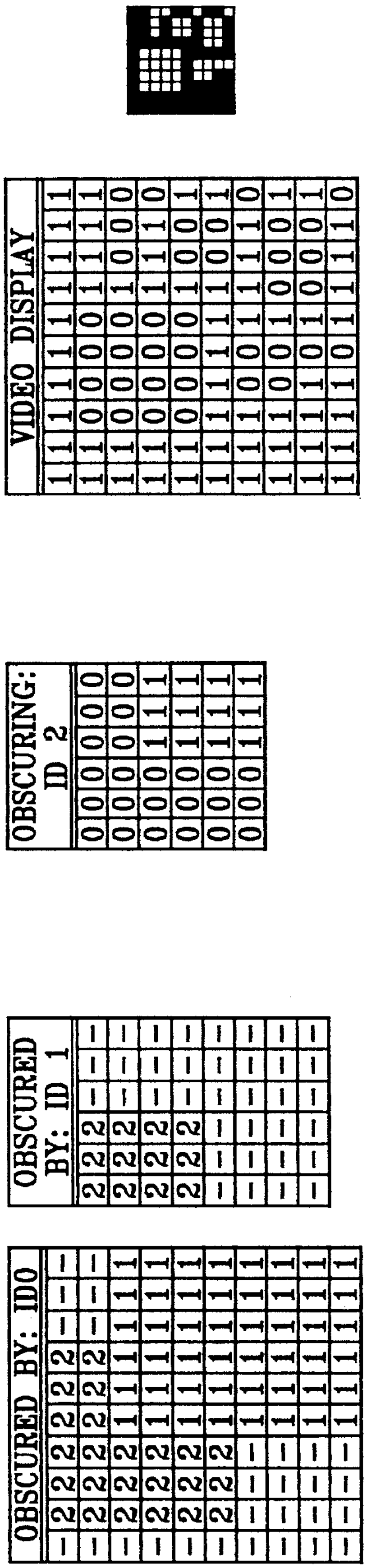

FIG. 6E depicts the product of the display window routine for displaying Window 2. As illustrated in FIG. 6E, the "Obscured By" table for Window 0 has been revised to indicate that at a predetermined location on Window 0, Window 1 and Window 2 are to be overlaid at predetermined locations. The "Obscured By" table for Window 1 has been revised to indicate that at a predetermined location on Window 1, Window 2 will obscure Window 1. The "Obscuring" table for Window 2 has been revised to indicate that Window 2 will obscure both Window 0 and Window 1 at predetermined locations. Accordingly, the video display depicts a "square" which has been overlaid upon the "B" which has been overlaid upon the "E". This is then displayed on LCD 24.

Figure 6F:
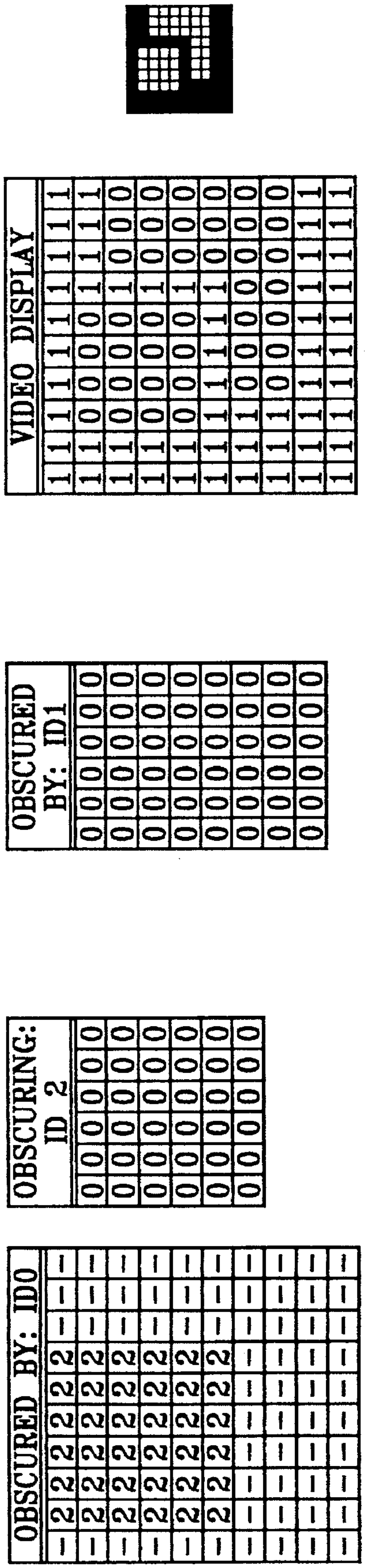

FIG. 6F depicts the product of the delete window routine wherein the delete window routine has deleted Window 1 from view from the LCD 24. As a result of the delete window routine, the "Obscured By" table for Window 1 has been revised to indicate that only Window 2 will be obscuring Window 0. Additionally, the "Obscuring" table for Window 2 has been revised to indicate that Window 2 is only obscuring Window 0. Finally, the "Obscured By" table for Window 1 has been revised to indicate that Window 1 is to be completely obscured by Window 0, which has the effect of deleting Window 1 from view from the LCD 24. Accordingly, the video display depicts the video information of Window 2 overlaid upon the video information of Window 0.

While this invention has been illustrated and described in accordance with a preferred embodiment, it is recognized that variations and changes may be made therein without departing from the invention as set forth in the following claims.

Having described the invention, what is claimed is:

1. A method for multiplexing video information as a plurality of windows on a display, the method performed by a CPU, and wherein each window has a numerical identification a plurality of pixels, and a size which is defined by predetermined height and width dimensions and a predetermined location on the display, the method comprising the following steps:

scanning each of the pixels of the first window completely along the window height and width;

creating in a RAM memory a plurality of tables for storing video pixel information and pixel ownership information for each window, and wherein the video pixel information is stored in a pixel content table and the pixel ownership information is stored in both an "obscuring" table and an "obscured by" table;

storing an image in a pixel content table of a first bottom window;

preparing the image of the pixel content table of the first window for display by setting a predetermined pixel ownership value for each individual pixel in both the "obscuring" table and the "obscured by" table of the first window;

storing an image in a pixel content table of a second overlaying window;

preparing the image of the pixel content table of the second window for display by setting a predetermined pixel ownership value for each individual pixel in both the "obscuring" table and the "obscured by" table of the second window;

determining the pixel ownership information for each pixel, and wherein the pixel ownership information is determined by reviewing the "obscuring" tables and the "obscured by" tables for the first and second windows;

for each pixel, determining whether a pixel ownership value in an "obscured by" table for a respective window equals a predetermined value for the numerical identification of the window;

copying, to a video memory of the display, the video pixel information for each pixel which has a pixel ownership value in an "obscured by" table of a respective window which is equal to the predetermined value for the numerical identification of the window; and displaying the first and second windows.

2. A method for multiplexing video information as a plurality of windows, as claimed in claim 1, and wherein the second overlaying window is deleted by accomplishing the following steps:

determining the pixel ownership information for each pixel by reviewing the "obscuring" tables and the "obscured by" tables for the first and second windows;

setting the pixel ownership information in the "obscured by" table of the second window equal to the predetermined value for the numerical identification of the first window.

3. A method for multiplexing video information as a plurality of windows, as claimed in claim 1, further comprising the following steps:

storing an image in a pixel content table of a third window to be overlaid upon the second window and the first window, respectively;

preparing the image of the pixel content table of the third window for display by setting a predetermined pixel ownership value for each individual pixel in both the "obscuring" table and the "obscured by" table of the third window;

determining the pixel ownership information for each pixel, and wherein the pixel ownership information is determined by reviewing the "obscuring" tables and the "obscured by" tables for the first, second and third windows;

for each pixel, determining whether a pixel ownership value in an "obscured by" table for a respective window equals a predetermined value for the numerical identification of the window;

copying, to a video memory of the display, the video pixel information for each pixel which has a pixel ownership value in an "obscured by" table of a respective window which is equal to the predetermined value for the numerical identification of the window; and displaying the first, second and third windows.

4. A method for multiplexing video information as a plurality of windows, as claimed in claim 3, and wherein the second window, being a window positioned between a first bottom window and a third top window is deleted by accomplishing the following steps:

determining the pixel ownership information for each pixel by reviewing the "obscuring" tables and the "obscured by" tables for the first and third windows;

for each pixel of the third window, revising the pixel ownership values of the "obscuring" table for the third window equal to the predetermined value for the numerical identification of first window, thereby deleting the second window.

5. A method for multiplexing video information as a plurality of windows, as claimed in claim 4, further comprising the following step:

for each pixel, revising the pixel ownership values of the "obscuring" table for the second window equal to a predetermined value which indicates that the second window is obscuring no other window.

6. A method for multiplexing video information as a plurality of windows, as claimed in claim 5, further comprising the following step:

for each pixel, revising the pixel ownership values of the "obscured by" table for the second window equal to a predetermined value which indicates that the second window is obscured by all windows.

7. A method for displaying video information on a display that includes a base window and an overlaying window, the base window being partially obscured by the overlaying window, said portion of the base window obscured by the overlaying window being defined as a display common area, each window having an associated display area comprised of a plurality of pixels each pixel having an individual predetermined pixel location on the display, a display height and a display width, the method performed by a CPU, and wherein each of the windows has a numerical identification, the method comprising the following steps:

scanning through the pixels of the base window completely along the display height and width of the base window;

creating in a RAM memory, which communicates with the CPU, a set of tables associated with each of the windows said set of tables for storing video pixel information and pixel ownership information for the associated window, and wherein the video pixel information for the associated window is stored in a pixel content table and the pixel ownership information is stored in both an "obscuring" table and an "obscured by" table;

revising the ownership information associated with the pixels of the base window to correctly reflect ownership of all the pixels comprising the base window, by the base window;

revising the obscured by table for the base window by setting the obscured by field for each pixel of the base window to the base window identification numeral including the pixels located in the common area, and revising the obscuring table for the base window by setting the field for each pixel in the common area to the overlaying window identification numeral;

storing an image in the pixel content table for display by the base window;

preparing a predetermined image to be displayed in the base window; and displaying the image in the base window by copying the video pixel information from the pixel content table to a video memory of the display.

* * * * *